United States Patent
Karlsson

(10) Patent No.: US 7,817,706 B2
(45) Date of Patent: *Oct. 19, 2010

(54) METHOD AND APPARATUS TO PERFORM REACTIVE JAMMING WHILE SIMULTANEOUSLY AVOIDING FRIENDLY PSEUDO-RANDOM FREQUENCY HOPPING COMMUNICATIONS

(75) Inventor: Lars Karlsson, Santa Clara, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/703,876

(22) Filed: Feb. 7, 2007

(65) Prior Publication Data

US 2007/0297489 A1 Dec. 27, 2007

Related U.S. Application Data

(63) Continuation-in-part of application No. 11/480,706, filed on Jul. 3, 2006, now Pat. No. 7,436,877, and a continuation-in-part of application No. 10/912,976, filed on Aug. 6, 2004, now Pat. No. 7,126,979.

(60) Provisional application No. 60/765,824, filed on Feb. 7, 2006.

(51) Int. Cl.
H04B 1/713 (2006.01)

(52) U.S. Cl. .................. 375/134; 375/132; 375/133; 375/131; 375/135; 375/130

(58) Field of Classification Search .......... 375/132, 375/130, 133, 134, 131, 135; 455/1; 342/14, 342/17; 370/319, 320.321
See application file for complete search history.

(56) References Cited

U.S. PATENT DOCUMENTS

| | | | | |
|---|---|---|---|---|
| 5,822,429 A * | 10/1998 | Casabona et al. | ........... | 380/252 |
| 6,036,351 A * | 3/2000 | Wagstaff | .................... | 708/321 |
| 6,232,909 B1 * | 5/2001 | Masciulli | .................... | 342/13 |
| 6,335,953 B1 * | 1/2002 | Sanderford et al. | ......... | 375/344 |
| 6,486,823 B1 * | 11/2002 | Benson et al. | ................ | 342/14 |
| 6,654,432 B1 * | 11/2003 | O'Shea et al. | .............. | 375/354 |
| 2002/0051498 A1 * | 5/2002 | Thomas et al. | .............. | 375/262 |
| 2003/0103589 A1 * | 6/2003 | Nohara et al. | ............... | 375/350 |
| 2004/0042568 A1 * | 3/2004 | Rowitch | ..................... | 375/346 |
| 2004/0243258 A1 * | 12/2004 | Shattil | ......................... | 700/73 |
| 2006/0140251 A1 * | 6/2006 | Brown et al. | ................. | 375/135 |

* cited by examiner

Primary Examiner—Shuwang Liu
Assistant Examiner—Helene Tayong

(57) ABSTRACT

Method and Apparatus to Perform Reactive Jamming While Simultaneously Avoiding Friendly Pseudo-Random Frequency Hopping Communications is disclosed. The system provides an enhancement to surgical reactive jammers that combines near-real-time jamming capability with the additional feature of allowing tactical communications. The jammer includes a synchronization subsystem that synchronizes jammer lockout frequencies with those frequencies being hopped to by units that are members of a friendly communications network. The synchronization subsystem is coordinated with, and therefore tied to the time-synchronized cryptography of the friendly communications net. As a result, the jammer will be aware, on a real-time basis, which frequency the friendly communications network will next be hopping to. The jammer's awareness of these future frequencies will allow those frequencies to be "locked out" of the jammer's transmission band dynamically.

18 Claims, 2 Drawing Sheets

METHOD AND APPARATUS TO PERFORM REACTIVE JAMMING WHILE SIMULTANEOUSLY AVOIDING FRIENDLY PSEUDO-RANDOM FREQUENCY HOPPING COMMUNICATIONS

This application is a continuation in part of application Ser. No. 11/480,706, filed Jul. 3, 2006 now U.S. Pat. No. 7,436,877, and Ser. No. 10/912,976, filed Aug. 6, 2004, now U.S. Pat. No. 7,126,979. The below-identified Provisional Application was copending with application Ser. No. 10/912,976.

This application is filed within one year of, and claims priority to Provisional Application Ser. No. 60/765,824, filed Feb. 7, 2006.

BACKGROUND OF THE INVENTION

1. Field of the Invention

This invention relates generally to electronic warfare and communications systems and, more specifically, to a Method and Apparatus to Perform Reactive Jamming While Simultaneously Avoiding Friendly Pseudo-Random Frequency Hopping Communications.

2. Description of Related Art

This provisional patent application relates to an enhanced electronic warfare reactive jammer capability to deny enemy communications while simultaneously avoiding (i.e. not jamming) friendly pseudo-random frequency hopping communications that are operating in the same vicinity.

It is worthy to note that this patent application is marginally similar, to a another patent application Ser. No. 11/480,706, entitled "Method and Apparatus to Perform Surgical Reactive Jamming While Maintaining Simultaneous Tactical Communications", also filed by this author. But that previous filing has sharp differences and distinctions from this present filing. The previous filing was for a reactive jammer that could itself also act as a secure communications device. The present filing is for a reactive jammer that can operate alongside separate 3rd party co-located military grade communications radios. The invention described herein outlines a unique technique to protect the pseudo-random frequency hopping signals of friendly 3rd party radios, which normally would have been jammed by a fast reactive jammer.

This capability is essential for mobile reactive jammer units in the field. Such field units typically need to maintain their own secure voice communications ("comms") with other mobile units, or higher eschelon commands, for tactical orders, safety considerations, and battlefield coordination. The problem today for present day units is that while performing their respective jamming missions, it precludes them from using their own tactical communications links due to the fact that the very nature of the reactive jammer will prevent their own tactical comms equipment to make a connection. Thus the operating personnel must make a choice between using one or the other at any given time. The invention described in this provisional patent application solves that issue and provides a unique capability to perform both surgical reactive jamming while simultaneously allowing tactical communications to proceed from separate 3rd party military radios. This invention is therefore vital to the interests of United States national security as it provides a valuable Electronic Warfare capability, as it greatly reduces electronic fratricide of our own communications nets.

The jammer device described by patent application Ser. No. 10/912,976 is sometimes referred to in the Electronic Warfare industry as a "wideband reactive jammer", "surgical follower jammer," or a "surgical reactive jammer" because it has the ability to quickly find enemy signals and then apply energy exactly on target so as to jam those enemy communication signals. This has greatest application against modern military radios that are known as "frequency hoppers". Unfortunately, the very same radio technologies are used for friendly communications. So this invention describes how to jam enemy pseudo-random frequency hopping signals, while simultaneously ignoring the friendly pseudo-random frequency hopping signals (from 3rd party radios).

What is needed therefore in order to feasibly detect and jam modern fast transmissions while at the same time maintain tactical communications with friendly 3rd party pseudo-random frequency hopping radios is a system that not only has: 1) The abilities stated in the aforementioned previous patent application Ser. No. 10/912,976, but also 2) The ability to accept and process the same frequency hopping program data of the 3rd party radios in question, and also 3) The ability to be precisely synchronized with all other friendly 3rd party radios in the field in both timing and communications hop sets, and finally 4) The ability to have a floating lockout (i.e. selectively not jam) all the frequency hopping signals from the friendly 3rd party radios.

SUMMARY OF THE INVENTION

In light of the aforementioned problems associated with the prior systems and method, it is an object of the present invention to provide a Method and Apparatus to Perform Reactive Jamming While Simultaneously Avoiding Friendly Pseudo-Random Frequency Hopping Communications. It is an object that the system provide an enhancement to surgical reactive jammers that combines near-real-time jamming capability with the additional feature of allowing friendly tactical communications. The jammer should include a system that synchronizes jammer lockout frequencies with those frequencies being hopped to by units that are members of a friendly communications network. The synchronization system should be coordinated with the time-synchronized cryptography of the friendly communications net. The jammer should, therefore, be aware, on a real-time basis, which frequency the friendly communications network will next be hopping to. The jammer's awareness of these future frequencies will allow those frequencies to be "locked out" of the jammer's transmission band dynamically.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and Apparatus to Perform Reactive Jamming While Simultaneously Avoiding Friendly Pseudo-Random Frequency Hopping Communications.

Figure 1:
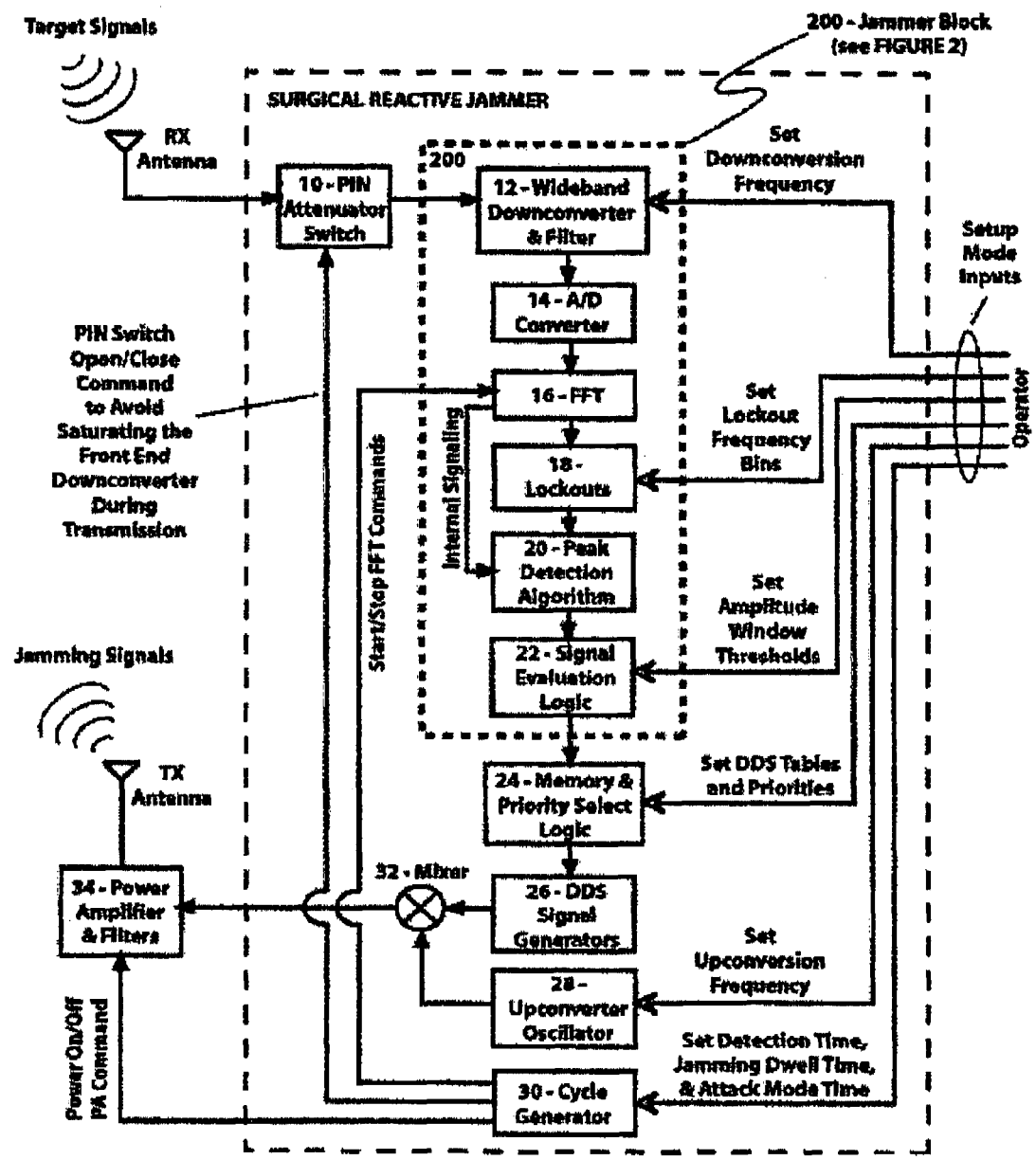
FIG. 1 is a depiction of the Surgical Reactive Jammer System of application Ser. No. 10/912,976.

The discussion of the present invention will first commence by review of FIG. 1, FIG. 1 shows the system diagram of a prior art surgical reactive jammer as described by patent application Ser. No. 10/912,976. As mentioned, the present invention is an extension and an augmentation to a previously filed U.S. patent application Ser. No. 10/912,976: "System and Method to Autonomously and Selectively Jam Frequency Hopping Signals in Near Real-Time." The disclosure of this patent application will be referenced continually throughout the instant description, and is therefore incorporated herein by reference.

This jammer uses a device that has a wideband front-end which can digitally processes the entire intermediate frequency (IF) output at once. Thus all the signal information contained within the bandwidth of the IF filter can be analyzed instantly. The resulting IF output may contain one or many short duration communication signals.

The next section contains the selection logic by which it is automatically determined whether or not the received signal should be jammed. The cycle generator section regulates the user configurable System timing. The final section of the surgical reactive jammer executes the jamming frequency generation and output, which must also occur extremely quickly. All of these processes occur in near real time.

The Wideband Downconverter, A/D Converter, FFT, Lockouts, Peak Detection Algorithm, and Signal Evaluation Logic sections of the prior art jammer design are not changed in the present invention. Thus for simplicity in drawing the following FIG. 2, those module sections are grouped together and labeled "Jammer Block".

Figure 2:
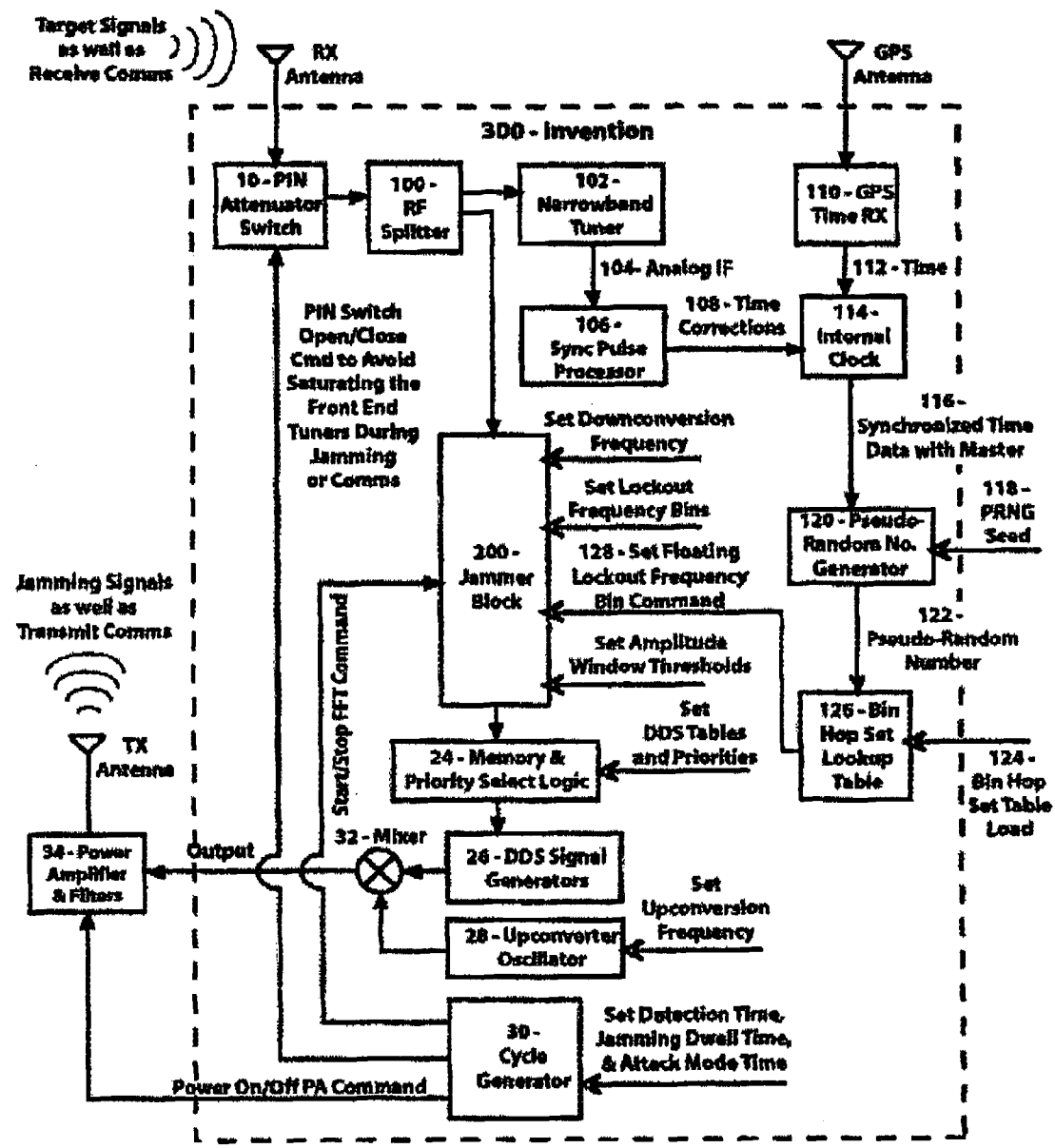
FIG. 2 is a depiction of the System of FIG. 1 further including the Synchronization Subsystem of the present invention.

FIG. 2 outlines a flow block diagram of the invention. An RF splitter is used to split the incoming signals into two fully independent processing paths (identified in application Ser. No. 11/480,706 as 400A and 400B). As an alternative embodiment of the invention, separate antennas could also be used. The first path is through the Jammer Block which performs all the surgical reactive jamming functions. In this path, the signals go through the normal processing to determine whether or not various detected signals should be jammed.

The second path is independent and uses it's own narrowband tuner to specifically pick up the synchronization channels (or over-the-air programming commands) of the 3rd party radios. These sync channels typically are used to broadcast timing information to the rest of the radio net from the master radio, so that all slave radios will be aligned with the clock of the master. The sync information is then fed to a processor and the results are fed into an internal clock module. This internal clock is disciplined by a GPS Time Receiver. The synchronized time is then fed to a conventional pseudo-random number generator which, when programmed with the same "hop-set" and "seed" values, will send out a pseudo-random number which corresponds to a specific bin number whereby the invention will know not to jam any information appearing on that particular bin frequency. The method of using FFT bins is unique and is the heart of the efficiency of this approach and invention. All of these functions above are described in more detail in the following Operation section of this patent application.

DIAGRAM REFERENCE NUMERALS

10 PIN Diode Attenuator Switch
12 Wideband Downconverter and Filters
14 Analog-to-Digital Converter (A/D)
16 Fast Fourier Transformations (FFT's)
18 Lockout Logic
20 Peak Detection Algorithm
22 Signal Evaluation Algorithm
24 Memory and Priority Select Logic
26 Direct Digital Synthesizer (DDS) Signal Generators
28 Upconverter Oscillator
30 Cycle Generator
32 Mixer
34 High Power Amplifier (PA) and Output Filter
100 RF Splitter
102 Narrowband Tuner
104 Analog IF Signals
106 Sync Pulse Processor
108 Time Correction Data
110 GPS Time Receiver
112 Time Data
114 Internal Clock
116 Synchronized Time Data with Master Radio
118 PRNG Seed
120 Pseudo-Random Number Generator (PRNG)
122 Pseudo-Random Number Output
124 Bin Hop Set Table Load
126 Bin Hop Set Lookup Table
128 Set Floating Lockout Frequency Bin Command
200 Jammer Block
300 Invention Operation The operation of the invention 300 is described here in this section. It is assumed that the reader is already familiar with how the reactive jammer technology works (minus the enhancement of this invention) by reading the aforementioned patent application Ser. No. 10/912,976. Most of the details regarding that prior art will not be discussed here. Rather the discussion in this document will focus on the invention 300 at hand which is an augmentation to the prior art system. As before, a wideband digital reception technique of the reactive jammer is used to instantaneously detect the presence of enemy signal energy within large bands of RF spectrum. Detection of signals occur on cyclical "look-through's" which are short time periods whereby the jammer does not radiate so as to allow the wideband front end tuner to have the sensitivity to pick up any newly occurring signals. Once this period is complete the jammer will emit energy once more until the next look-through period. This "attack cycle" repeats itself indefinitely during jamming operations. This element of the prior art is the same as the invention 300. The difference arises out of additional circuitry and software that synchronizes with the 3rd party frequency hopping radios and then feeds specific information back into the jammer decision tree which alters the (transmission) firing solution.

To begin with, a short discussion on the nature of military frequency hopping radios is required. It is assumed that the reader is familiar with how standard military grade frequency hopping radios work and are utilized in a network. But to summarize, most frequency hopping radios require several data elements in order to operate. The minimum requirements are the values of a frequency hop set and a pseudo-random number generator (PRNG) Seed value. Some radios, for example, also have additional data elements such as transmission keys and net ID values. This patent will focus on the generic version of a military grade frequency hopping radio. Continuing forward, the hop set and PRNG Seed tell the radios in a net when and where the next frequency setting to send information will be. All data is broken up into small chunks and sent over these pseudo-randomly distributed frequencies at definable times. This principle is leveraged in this patent application as the invention 300 will become another "node" in the 3rd party communications net. It will be a slave to the master radio which coordinates the timing of the frequency hops. In that way, the invention 300 will "know" what the next hop is at all moments in time. In so doing, it will calculate the corresponding frequency bin number and use that bin number and a user settable number of adjacent bin numbers as a lockout into the decision tree chain of the jammer. Thus, a "floating lockout" will be established which will protect the 3rd party communications net frequency hops at all times. This is the general principle of operation of the invention 300.

Continuing forward with the invention 300 description, signals come in through the receive antenna and are passed through the PIN attenuator switch 10. This switch is only connected when a look-through or talk-through period is active. The incoming signals are split equally by an RF splitter 100.

One path of the incoming signals leads to jammer block 200, which contains the sub-modules shown in FIG. 1. As mentioned, the processing of this path is identical to that of the previous patent application for the reactive jammer. Since there are no changes to the jamming functionality, the processing details will not be covered again in this document.

The second path of the incoming signals leads to new additional hardware modules of this invention 300. The signal proceeds to a narrowband tuner 102 which has the function of listening for the synchronization/programming channels of the radio net. Once detected, it will downconvert the signals to an intermediate frequency for further processing. The resulting analog IF signal 104 is then fed to circuitry which processes the synchronization pulses 106 and creates a time correction. The time correction data 108 is then fed to an internal clock 114.

The internal clock 114 is a standard counter which is used to maintain the system's precise time. Since frequency hopping radios in use today coordinate their information transfer according to specific times, this circuitry plays a pivotal role in synchronizing the invention 300 with the rest of the 3rd party communications net. A GPS time receiver 110 is used to maintain fidelity and to discipline the internal clock. The time corrections 108 and the time values 112 both feed into the internal clock 114 and the outputs are time values 116 that are synchronized with the master radio in the net.

The synchronized time with the master 116 is then fed to the PRNG 120. This PRNG is the exact same algorithm as the one that is used in the 3rd party radios. For the invention 300 to work, there are three things that must be same with the 3rd party radios in question. The first is that the PRNG 120 needs to be identical between both devices. The second is that both the invention 300 and the 3rd party radios need to be programmed with the same PRNG Seed 118. And thirdly, the same hop set that is used in the radios must be also input into the invention 300. Thus, with the synchronized timing information 116 and the same PRNG Seed 118 when input into the PRNF 120 will be the same pseudo-random number 122.

The final step is for the pseudo-random number 122 to be fed into the bin hop set lookup table 126. Initially, the hop set of the radios must be translated into a bin hop set load 124. This can be done either offline or automatically by the invention 300. The bin hop set load 124 is a frequency bin representation of the analog frequency hop set of the radios. In the radio, the pseudo-random number 122 identifies the exact frequency setting for the radio to tune to in order to hear the next transmission hop. In the invention 300, the pseudo-random number 122 identifies the corresponding bin number where the hop frequency would be. The result is the setting of a lockout on that particular bin 128. The optimum way for the jammer to digitally process this information fast enough is by operating by digital bin number values and not by analog frequency values. This approach and technique is unique and is the optimal way to perform the automated lockout process in the reactive jammer system.

As the reader can see, the same frequency hopping pattern that is used for the transmission of tactical communications with the 3rd party radios is also used as a "floating lockout" situation in the invention 300. Once the invention 300 is synchronized with the friendly frequency hopping radios, it will "be aware" of the next hop frequency in the net. It will then pass along that exact frequency hop bin number to the invention's lockout circuitry 18 inside the jammer block 200 where the hop bin will be temporary programmed into the protected frequencies table for a period of time until the next hop occurs. So when the radio net moves to the next hop, the invention 300 will be aware of that and will mark the next hop bin accordingly as a protected frequency and release the former bin. This creates a "floating lockout" bin situation.

In conclusion, this invention 300 is only able to process all reactive jamming fast enough by using FFT bin numbers (as described in the previous patent application that this patent application builds upon). The virtue of the system is that it is fast enough to handle frequency hopping radios. This invention now deals with the real world issue of jamming friendly frequency hopper radios.

The requirements for such compatibility are that the radios and the invention have the same PRNG, have the same PRNG Seed value, and have the same hop set data. Typically in real world systems, the PRNG Seed value and the hop set data are encapsulated in one single data load. This invention is flexible enough to handle all such data loading protocols. An alternate embodiment of the invention is to be able to load the critical information on the fly, over the air. This can be done by utilizing the narrowband tuner 102 to detect the wireless commands and process them accordingly. In some radio systems, this process is known as the Electronic Remote Fill feature.

Through the unique methods and techniques presented here, this invention will allow jamming missions to continue while simultaneously allowing friendly 3rd party tactical communications radios to not be jammed. This will lead to significantly less electronic fratricide in the field and offer the unique ability to jam while maintaining tactical comms Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An electronic signal jamming system having synchronized, frequency-hopping transmission lockouts, comprising: antennae means for receiving incident RF signals; an RF splitter for splitting said incident RF signals into a jamming system input data stream and a synchronizing input data stream; a dynamic synchronization subsystem, comprising: a synchronization receive module for receiving said synchronizing input data stream and converting it to a time correction data stream if said synchronizing system input data stream is on one of a group of predetermined frequencies; a random number generator (RNG) means for generating time-synchronized random numbers, said RNG means responsive to said time correction data stream; and a bin lockout command generator (BLCG) means for generating floating lockout frequency bin commands, said BLCG means responsive to said RNG means; and an electronic signal jamming system, comprising: a wideband signal collection front end receiving said jamming system input data stream; and a signal evaluation logic module responsive to said floating lockout frequency bin commands; and an internal transmitter also responsive to said signal evaluation logic module for transmitting a jamming signal on a frequency of interest determined by said signal evaluation logic module.

2. The system of claim 1, wherein said synchronization receive module further comprises: a narrowband tuner for converting said synchronizing input data stream into an analog IF data stream if said synchronizing input data stream is on a frequency that is one of said group of said predetermined frequencies; and synchronizing pulse processor means for converting said analog IF data stream into the time correction data stream.

3. The system of claim 2, wherein said synchronization receive module further comprises: time signal receiver means for receiving a master time signal; a synchronizing internal clock responsive to said master time signal and said time correction data stream to generate a synchronized time data stream; and whereby said RNG means said responsiveness comprises said RNG means being responsive to said synchronized time data stream.

4. The system of claim 3, wherein said RNG means is further responsive to a preloaded seed value.

5. The system of claim 4, wherein said BLCG means is further responsive to a preloaded table of hop data, whereby said lockout frequency bin commands are responsive to said time-synchronized random numbers and said hop data.

6. The system of claim 5, wherein said electronic signal jamming system further comprises: said wideband signal collection front end having a wideband receiver for receiving RF signals across a broad spectrum, a digitizer for creating a continuous stream of digitized data representing said received RF signals, and a digital data conversion means for converting said digitized data into FFT frequency bins; and said signal evaluation logic module having a comparing means for comparing each said frequency bin to configurable preset lockout frequency bins in addition to frequency bins identified within said floating lockout frequency bin commands, a peak detection means for evaluating and calculating an amplitude value for each bin by using a configurable number of data point samples for each of those bins, a windowing means for evaluating and calculating the amplitude value for each bin by using a configurable number of data point samples for each of those bins, and a priority selection means for evaluating the prioritization of jammer signal targets based upon configurable settings; and an internal transmitter also responsive to said comparing, peak detection, windowing, and priority logic for transmitting the jamming signal on the frequency of interest.

7. The system of claim 6, wherein said digital data conversion means comprises means for converting said digitized data from a time domain to a frequency domain.

8. The system of claim 7, wherein said digital data conversion means comprises means for converting said frequency domain converted data from separate real and imaginary components to normalized amplitude data.

9. The system of claim 8, wherein said normalized amplitude data is categorized by frequency bins.

10. The system of claim 9, wherein said comparing means comprises comparing data in said frequency bins to both present and floating frequency lockouts.

11. The system of claim 10, further comprising peak detection means for evaluating the amplitude of said frequency bins.

12. The system of claim 11, wherein said windowing means for evaluating each bin to be within configurable amplitude bound limits.

13. The system of claim 12, further comprising means for comparing said amplitude-evaluated signal to a pre-established signal priority list.

14. The system of claim 13, wherein said signal priority logic means further compares said amplitude-evaluated signal to a real-time priority request.

15. A method for synchronizing jamming Radio Frequency (RF) with third party RF communications, comprising the steps of: detecting an analog RF signal transmission; splitting said analog RF signal transmission into a jamming system RF (JSRF) signal and a synchronization subsystem RF (SSRF) signal; generating a floating lockout frequency bins responsive to said SSRF signal; executing a jamming method, said jamming method comprising the steps of: digitizing said detected JSRF signal; converting said digitized JSRF signal into frequency bins; comparing said frequency bins to said floating lockout frequency bins; evaluating and calculating an amplitude value for each said bin by using a configurable number of data point samples for each of those bins; evaluating a prioritization of jammer signal targets based upon configurable settings; triggering a start of a conversion of said digitized signals into said frequency bins; triggering an end of the conversion of said digitized signals into said frequency bins; triggering a release of frequency bin information at a correct time; triggering of an external power amplifier at the correct time to prepare for jammer signals; and automatic programming of a digital signal generator to generate a jamming signal, said signal generator triggering responsive to said comparing.

16. The method of claim 15, wherein said jamming method further comprises a lockout step prior to said comparing step, said lockout step comprising comparing said converted digitized signals to a dynamic list of lockout frequency bins.

17. The method of claim 16, wherein said jamming method further comprises a signal threshold-comparing step prior to said comparing step, comprising comparing said frequency bins to signal threshold settings.

18. The method of claim 17, wherein digital transmitter triggering step is responsive to said signal threshold-comparing step.

* * * * *

UNITED STATES PATENT AND TRADEMARK OFFICE
CERTIFICATE OF CORRECTION

| | | |
|---|---|---|
| PATENT NO. | : 7,817,706 B2 | |
| APPLICATION NO. | : 11/703876 | |
| DATED | : October 19, 2010 | |
| INVENTOR(S) | : Lars Karlsson | |

It is certified that error appears in the above-identified patent and that said Letters Patent is hereby corrected as shown below:

In column 8, line 21, in Claim 15, after "(RF)" insert -- signal transmissions --.

Signed and Sealed this
Eighteenth Day of January, 2011

David J. Kappos
*Director of the United States Patent and Trademark Office*